UNITED STATES PATENT OFFICE.

CHARLES B. DUDLEY, OF ALTOONA, PENNSYLVANIA.

PURIFYING WATERS FOR BOILER USE.

SPECIFICATION forming part of Letters Patent No. 283,472, dated August 21, 1883.

Application filed October 28, 1882. (No specimens.)

*To all whom it may concern:*

Be it known that I, CHARLES B. DUDLEY, of Altoona, county of Blair, and State of Pennsylvania, have invented new and useful Improvements in the Art of Purifying Natural Waters; and I do hereby declare that the following is a full and exact description of the same.

This discovery relates to the art of purifying natural waters for use in steam-boilers; and it consists in treating these waters, before the same are introduced into the boiler, with soda lime mixed in certain definite proportions, as will be fully described hereinafter.

The method of carrying my discovery practically into effect is substantially as follows: The water to be purified, having been analyzed to ascertain its chemical composition, is treated with soda lime in a powdered condition in such quantity as to combine with the carbonic acid in the water. The amount of soda lime required may be determined by the use of test-paper in the manner well understood; or the causticity of the soda lime being known, a weighed amount sufficient to satisfy the carbonic acid, both free and as bicarbonates, may be added to the water. The proportions of the lime and soda in the soda lime used depend on the ratio between the carbonic acid, both free and as bicarbonates, and the sulphuric acid and chlorine in the water to be treated—that is, it should contain enough caustic lime (or its equivalent) to combine with the carbonic acid, both free and as bicarbonates in the water, and at the same time soda enough to combine with the sulphuric acid and chlorine in the water. For example, in a water having thirteen grains per gallon of carbonic acid, both free and as bicarbonates, and two grains each per gallon of sulphuric acid and chlorine, a soda lime would be required containing caustic lime (or its equivalent) and soda ($Na_2O$) in the ratio of five to one, or nearly so. After the soda lime has been added to the water and the same has been thoroughly agitated for an hour or more, it is allowed to stand until the mineral impurities have settled to the bottom. The clear water may then be drawn off from above the precipitates for use.

The matter of agitation assumes special importance in the practice of this method, for the reason that the material to be diffused through the mass of water is introduced in the form of a powder instead of in solution.

The principal chemical reactions or changes which take place as the result of the above addition of soda lime to the natural waters are probably as follows: The caustic substances in the soda lime—either caustic lime, caustic magnesia, or caustic soda, or all three of them—combine with the carbonic acid, either free or as bicarbonates, in the water, forming carbonates of these substances. The carbonates of lime and magnesia formed—together with the carbonates of lime and magnesia, and, possibly, some sulphate of lime and other mineral matters, which were held in solution in the water by the carbonic acid, either free or as bicarbonates—separate from the water as precipitates, leaving in solution the carbonate of soda formed, and the sulphates and chlorides of lime and magnesia, iron and alumina if any of these be present in the water. The carbonate of soda then reacts with the above sulphates and chorides, except, possibly, the magnesia salts, forming chlorine and sulphate of soda and carbonate of lime, and, possibly, carbonate of magnesia and hydrated oxides of iron and alumina. The soda salts remain in solution, but the others are precipitated and settle to the bottom of the tank, as above described. The above reactions probably occur simultaneously; but for the sake of explanation they are supposed to take place in two stages. The result of the whole operation is that by far the largest part of the mineral impurities existing in the water previous to treatment are removed, rendering the water very much more valuable for steam-generation.

I am aware that a hot solution of caustic lime and caustic soda has been added to sewage waters for the purposes of purification, and that some of the reactions above given would probably follow such addition; but the directions given in the described method would not enable natural waters to be successfully purified for boiler use. Furthermore, no statement is made that it is necessary to vary the proportions of lime and soda according to the water to be purified. With me this is essential. One soda lime will not purify all waters. The foundation upon which my method rests is definite proportions between the soda and the lime.

If desired, the powdered soda lime, after having been mixed in definite proportions, may be mixed with water before its introduction into the water to be purified as a means of facilitating its introduction and action.

Having thus fully described my discovery, what I claim as new, and desire to secure by Letters Patent, is—

The herein-described method of purifying natural waters for boiler use, consisting in treating these waters, before they are introduced into the boiler, with definite amounts of a soda lime composed of definite proportions of soda and lime, varied according to the water to be treated, as and for the purpose set forth.

This specification signed and witnessed this 25th day of October, 1882.

CHAS. B. DUDLEY.

Witnesses:
FRANK M. GREEN,
H. W. BEADLE.